(12) United States Patent
Doerflinger et al.

(10) Patent No.: US 11,047,566 B2
(45) Date of Patent: Jun. 29, 2021

(54) LIGHTING ASSEMBLY FOR STORAGE UNITS

(71) Applicant: SNAP-ON INCORPORATED, Kenosha, WI (US)

(72) Inventors: David A. Doerflinger, Franksville, WI (US); Ottoleo Kuter-Arnebeck, Kenosha, WI (US)

(73) Assignee: SNAP-ON INCORPORATED, Kenosha, WI (US)

( * ) Notice: Subject to any disclaimer, the term of this patent is extended or adjusted under 35 U.S.C. 154(b) by 156 days.

(21) Appl. No.: 16/457,388

(22) Filed: Jun. 28, 2019

(65) Prior Publication Data
US 2020/0408399 A1    Dec. 31, 2020

(51) Int. Cl.
| | | |
|---|---|---|
| *F21V 33/00* | (2006.01) | |
| *A47B 88/919* | (2017.01) | |
| *B25H 3/04* | (2006.01) | |
| *F21V 23/04* | (2006.01) | |
| *F21Y 115/10* | (2016.01) | |

(52) U.S. Cl.
CPC ........ *F21V 33/0084* (2013.01); *A47B 88/919* (2017.01); *B25H 3/04* (2013.01); *F21V 23/0471* (2013.01); *F21Y 2115/10* (2016.08)

(58) Field of Classification Search
CPC ............. F21V 33/0084; F21V 33/0471; A47B 88/919; B25H 3/04
See application file for complete search history.

(56) References Cited

U.S. PATENT DOCUMENTS

| | | |
|---|---|---|
| 1,617,452 A | 2/1927 | Marks |
| 1,928,151 A | 9/1933 | Goldman |
| 4,178,626 A | 12/1979 | Marcus |
| 4,300,185 A | 11/1981 | Wakamatsu |
| 4,383,289 A | 5/1983 | Lewin |
| 4,519,019 A | 5/1985 | Hall |
| 5,079,680 A | 1/1992 | Kohn |
| 5,246,285 A | 9/1993 | Redburn et al. |
| 5,530,628 A | 6/1996 | Ngai |
| 5,873,646 A | 2/1999 | Fjaestad et al. |
| 5,961,200 A | 10/1999 | Friis |
| 6,203,167 B1 | 3/2001 | Liu et al. |
| 7,055,983 B1 | 6/2006 | Baker et al. |
| 7,157,667 B2 | 1/2007 | Gramlich et al. |
| 7,367,685 B2 | 5/2008 | Moll |

(Continued)

FOREIGN PATENT DOCUMENTS

| | | |
|---|---|---|
| DE | 202009008748 U1 | 9/2009 |
| GB | 2577179 A | 3/2020 |
| WO | 2006125630 A1 | 11/2006 |

OTHER PUBLICATIONS

Search Report for Application No. GB2008117.0 dated Sep. 3, 2020, 4 pages.

(Continued)

*Primary Examiner* — Anne M Hines
(74) *Attorney, Agent, or Firm* — Seyfarth Shaw LLP

(57) ABSTRACT

An illumination assembly adapted to be coupled to a storage unit (such as a top portion or working surface area). The illumination assembly may be coupled to a retrofittable or integrated feature of the storage unit to direct or radiate the light into an interior containment space of a work tray (such as a drawer) of the storage unit.

22 Claims, 6 Drawing Sheets

(56) References Cited

U.S. PATENT DOCUMENTS

| | | |
|---|---|---|
| 7,657,344 B2 | 2/2010 | Holmes et al. |
| 7,954,979 B2 | 6/2011 | Sommers et al. |
| 8,090,473 B2 | 1/2012 | Higham |
| 8,449,050 B2 | 5/2013 | Karg |
| 8,876,314 B2 | 11/2014 | Zhu et al. |
| 8,966,926 B2 | 3/2015 | Eveland et al. |
| 10,317,130 B2 | 6/2019 | Alt et al. |
| 2002/0171335 A1 | 11/2002 | Held |
| 2005/0062238 A1 | 3/2005 | Broadfield et al. |
| 2005/0270770 A1 | 12/2005 | Warrender et al. |
| 2007/0274042 A1 | 11/2007 | Jackson |
| 2008/0180944 A1 | 7/2008 | Galvez et al. |
| 2008/0274042 A1 | 11/2008 | Jackson et al. |
| 2011/0193454 A1* | 8/2011 | Karg .................. A47B 88/463 312/237 |
| 2013/0208455 A1* | 8/2013 | Chung .................. F21V 23/04 362/184 |
| 2016/0022526 A1 | 1/2016 | Chen et al. |
| 2016/0313051 A1 | 10/2016 | Alt et al. |
| 2016/0313053 A1 | 10/2016 | Eicher et al. |
| 2017/0115052 A1 | 4/2017 | Kendall et al. |
| 2017/0131024 A1 | 5/2017 | Kempfle et al. |
| 2017/0136957 A1 | 5/2017 | Kirtley |
| 2017/0340112 A1 | 11/2017 | Miles |
| 2018/0106439 A1 | 4/2018 | Dhali et al. |

OTHER PUBLICATIONS

Examination Report No. 1 for Application No. 2020204022 dated Feb. 9, 2021, 10 pages.

* cited by examiner

LIGHTING ASSEMBLY FOR STORAGE UNITS

TECHNICAL FIELD OF THE INVENTION

The present invention relates generally to lighting assemblies. More particularly, the present invention relates to a lighting assembly for a storage unit that is adapted to radiate light in a downward and/or outward direction.

BACKGROUND OF THE INVENTION

Storage units are often used in dark places and/or in places with lighting that causes an interior containment space (e.g., an interior of a drawer) to be darkened or difficult to see. In order to improve visibility, a light is typically affixed by magnet or screw type fasteners to a top surface of a work tray of the storage unit to shine down into the interior containment space. However, this solution is cumbersome and unwieldly, as the light obstructs access to the work tray of the storage unit and often the entire work tray is not properly illuminated, either by limitations of the light or shadows.

SUMMARY OF THE INVENTION

The present invention broadly relates to an illumination assembly adapted to be coupled to a storage unit (such as a top portion or working surface area) by coupling the illumination assembly to a retrofittable or integrated feature of the storage unit to direct or radiate light into an interior containment space of a top portion (such as a drawer) of the storage unit.

In an embodiment, the present invention broadly includes an illumination assembly for a storage unit with a drawer. The illumination assembly includes a housing, an illumination source disposed in the housing, and a bracket coupled to the housing and extending at an angle relative to the housing. The bracket is adapted to couple to the storage unit and the angle causes the illumination source to emit light towards an interior of the drawer, when the illumination source is disposed in an ON state.

In another embodiment, the present invention broadly includes a storage unit with a compartment. The storage unit includes a top portion with a flange that extends at a first angle and an illumination assembly. The illumination assembly includes a housing, an illumination source disposed in the housing, and a bracket coupled to the housing and extending at a second angle relative to the housing. The bracket is coupled to the flange and the first and second angles cause the illumination source to emit light towards an interior of the compartment, when the illumination source is disposed in an ON state.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

DETAILED DESCRIPTION OF THE EMBODIMENTS

Figure 1:
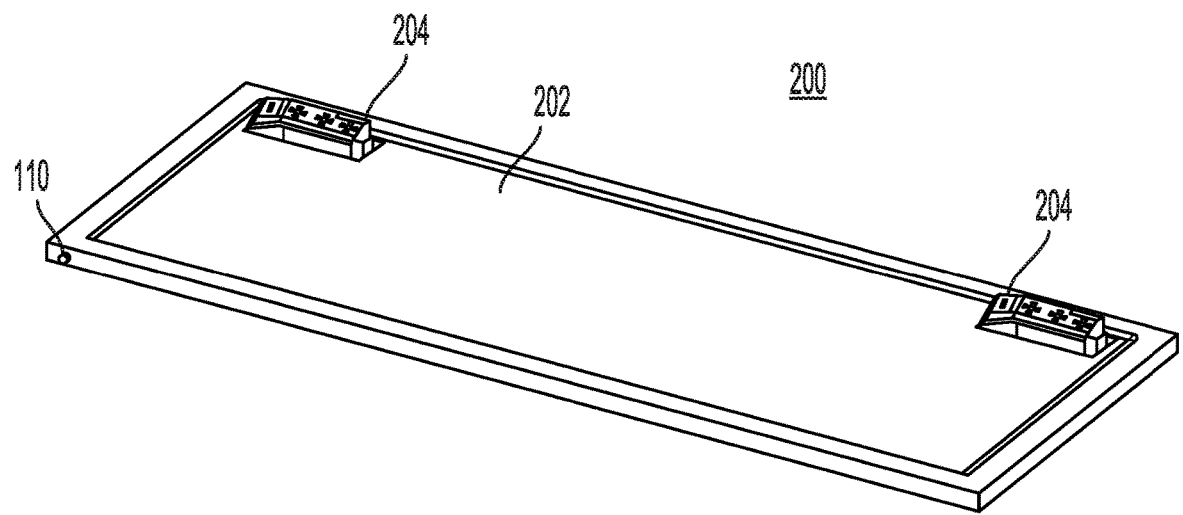
FIG. 1 is a top perspective view of an illumination assembly coupled to a top portion (such as a working surface area) of a storage unit according to an embodiment of the present invention.

While this invention is susceptible of embodiments in many different forms, there is shown in the drawings, and will herein be described in detail, a preferred embodiment of the invention with the understanding that the present disclosure is to be considered as an exemplification of the principles of the invention and is not intended to limit the broad aspect of the invention to embodiments illustrated. As used herein, the term "present invention" is not intended to limit the scope of the claimed invention and is instead a term used to discuss exemplary embodiments of the invention for explanatory purposes only.

The present invention broadly relates to an illumination assembly adapted to be coupled to a storage unit (such as a top portion or working surface area) by coupling the illumination assembly to a retrofittable or integrated feature of the storage unit to direct or radiate light into an interior containment space of a work tray (such as a drawer) of the storage unit.

Referring to FIGS. 1 to 4, an illumination assembly 100 may be coupled to a storage unit, such as a top portion 200 of the storage unit, and adapted to direct or radiate light in an outward and/or downward direction relative to the storage unit. The light may be adapted to radiate light into an interior containment space (such as a drawer) of the storage unit, when such drawer is opened, to illuminate the contents of the containment space.

As illustrated, the illumination assembly 100 includes a housing 102, a light source 104, a bracket 106 with an attachment feature 108, and a switch 110. One or more illumination assemblies 100 may be coupled to the top portion 200 of the storage unit, or a single elongated illumination assembly 100 may be coupled to and extend along a length of the top portion 200.

The light source 104 may be disposed in the housing 102 and electrically coupled to a power source via the switch 110. The housing 102 may include a lens (not shown) to diffuse or direct light emitted by the light source 104. The light source 104 may be a long lasting, low power consumption light emitting diode (LED) or other light emitting device. When the light source 104 is illuminated, light is radiated from the light source 104 into an interior containment space (such as a drawer) of the storage unit, whereby the light propagates into the interior of the containment space to illuminate the contents of the containment space.

Figure 4:
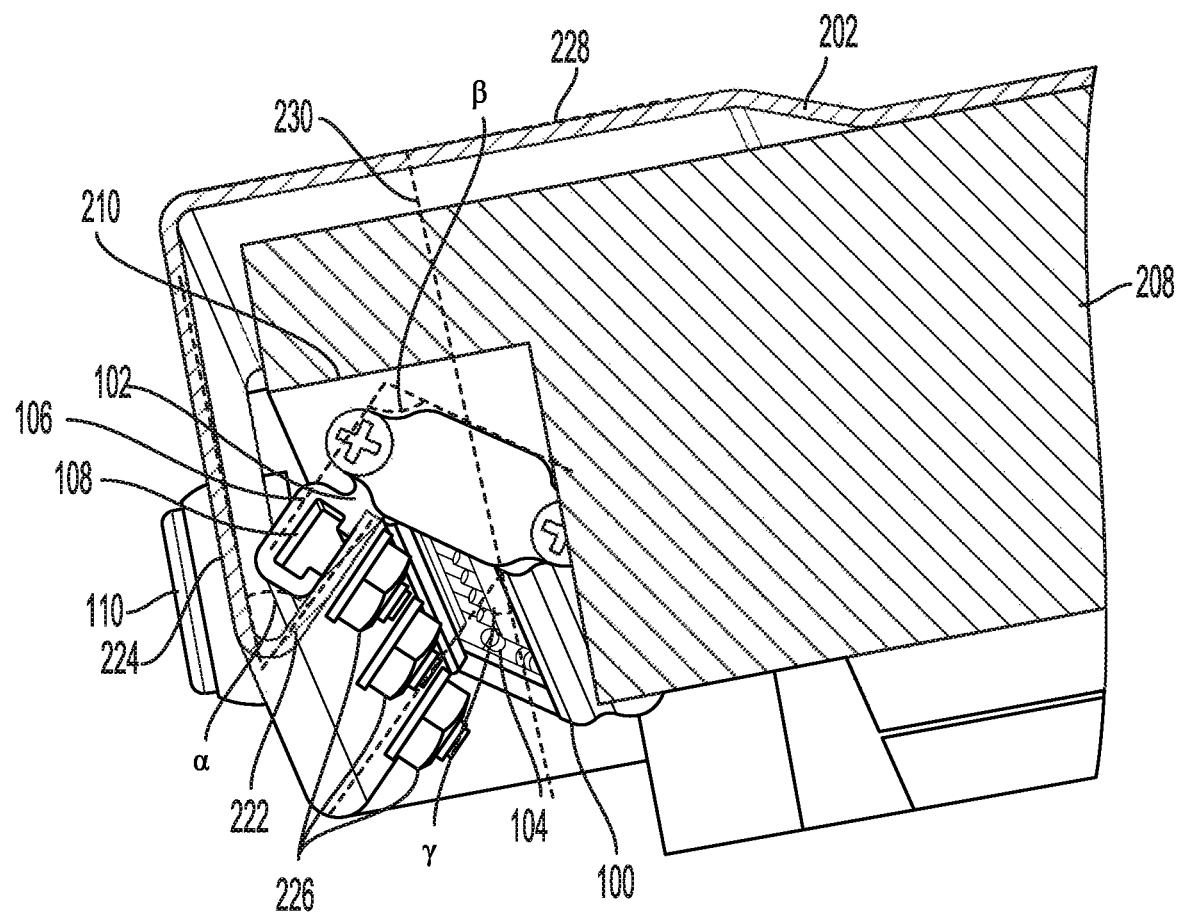
FIG. 4 is another section view of a portion of the top portion of the storage unit of FIG. 1 illustrating the illumination assembly.

The bracket 106 may be coupled to the housing 102 and extend from the housing 102 at an angle. Referring to FIG. 4, the angle of the housing 102 and bracket 106 relative to each other is illustrated as angle β. The bracket 106 may also include an attachment feature 108. The attachment feature 108 can be a channel, groove, or other attachment type feature. The housing 102 can be coupled to the bracket 106 via the attachment feature 108. Alternately, the bracket 106 can be coupled to the housing 102 without the attachment feature 108. The bracket 106 may be a separate feature coupled to the housing 102 as part of an assembly or may be integral to the housing 102 and constructed as one continuous element, such as an extrusion. The bracket 106 and the housing 102 are oriented and adapted to direct the light radiating from the light source 104 into the interior containment space.

The switch 110 can be a manually operated switch, a sensor type switch, or a sensor, such as a proximity or motion sensor. The switch 110 can be coupled on or in the top portion 200 of the storage unit (such as a body 202 of the top portion 200). The switch 110 may include an actuation mechanism that employs a push button actuator or other type of actuator to activate or operate the switch 110. Alternately, the switch 110 can be a toggle actuator, a touch sensitive actuator, a slide actuator, or other suitable actuator or device. The switch 110 is used to turn the light source 104 between ON and OFF states. When the illumination assembly 100 is installed in a storage unit with drawers, as described herein, the light source 104 may be oriented to emit or radiate light in an outwardly and/or downwardly direction into the drawers. When the drawers of the storage unit are opened and pulled out from the storage unit, the switch 110 can be actuated to electrically connect the light source 104 to the power source to turn the light source 104 to the ON state, thus causing illumination. Conversely, when the drawers are closed, the switch 110 can be actuated to electrically disconnect the light source 104 from the power source and turn the light source 104 to an OFF state.

The switch 110 may be actuated manually or automatically based on sensing of motion and/or the drawer being open or closed. The switch 110 may also include a timer (not shown) that is adapted to actuate the switch 110 to turn the light source 104 to an OFF state after a predetermined amount of time has passed while the light source 104 has been in an ON state.

As mentioned above, the illumination assembly 100 may be installed in or on a storage unit. For example, the storage unit may include a top portion 200 and one or more interior containment spaces (not shown), such as drawers. As illustrated, the top portion 200 includes a body 202 and an electrical outlet 204. The body 202 may be a substantially flat, semi-enclosed case, and although FIGS. 1 through 4 show the body 202 as substantially rectangular, the body 202 may be various sizes and shapes, such as square, circular, triangular, polygonal, or any other geometric shape. The body 202 may be constructed of metal, composite, or other suitable material. The body 202 may house the electrical outlet 204, and the illumination assembly 100 may be coupled to the body 202. As illustrated in FIG. 1, the electrical outlet(s) 204 may be coupled to a top surface of the body 202 and extend or be accessible through the top surface of the body 202. The electrical outlet(s) 204 may also be electrically coupled to the power source, as described herein.

Figure 2:
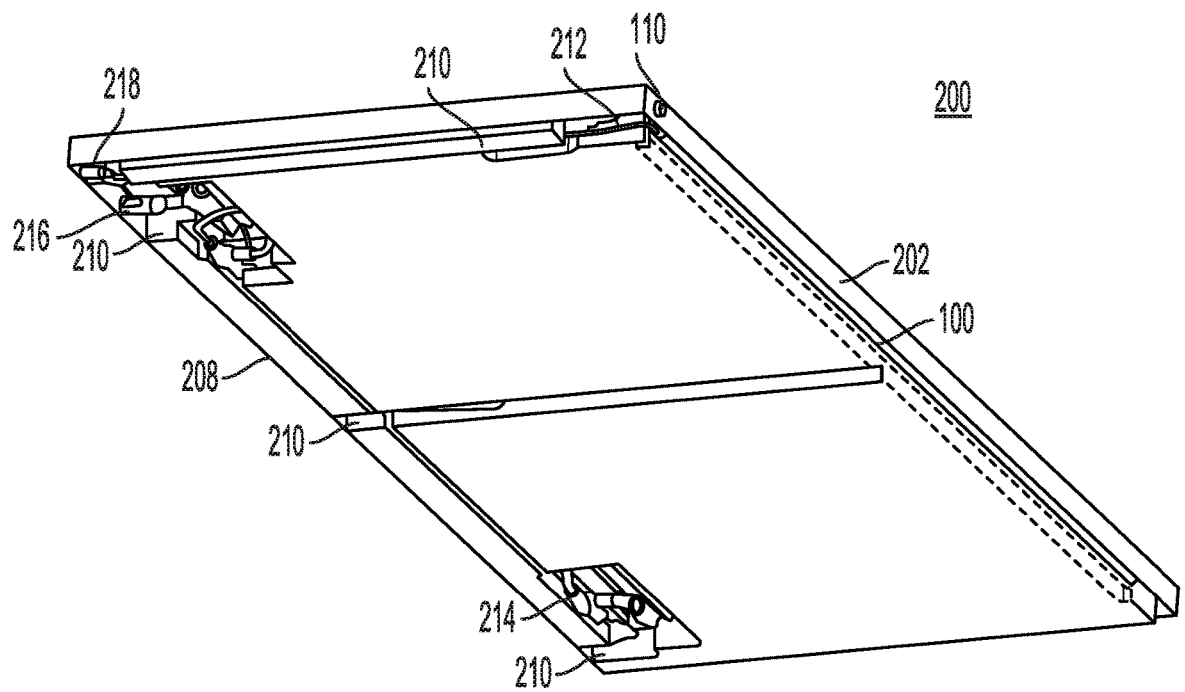
FIG. 2 is a bottom perspective view of the illumination assembly coupled to the top portion of the storage unit of FIG. 1.
Figure 5:
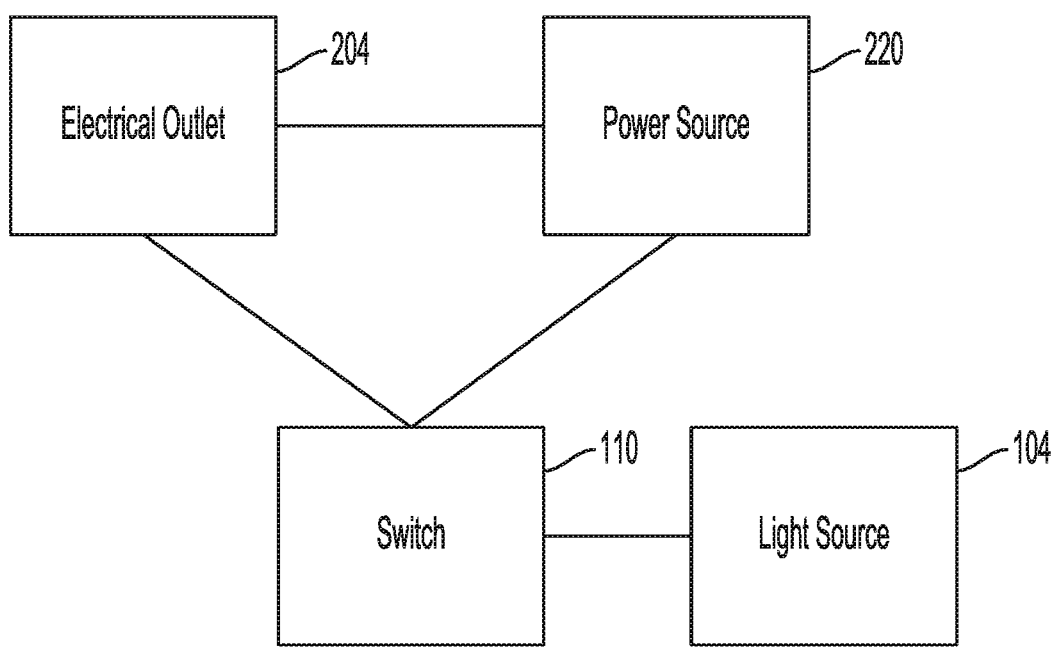
FIG. 5 is a simplified block diagram of one example of the illumination assembly and electronic components.

Referring to FIG. 2, the body 202 may include a substructure 208. The substructure 208 can be solid, hollow, or an architectured construction and made of wood, composite, or other suitable material. The substructure 208 may include routing paths 210 (such as grooves or channels) therein that allow for passage of electrical wiring 212, 214. The electrical wiring 214 electrically couples the electrical outlet(s) 204 to electrical connection 216. The electrical wiring 212 couples the illumination assembly 100 to electrical connection 218, via the switch 110. The electrical connections 216, 218 may also be electrically coupled to a power source 220 (as shown in FIG. 5). The power source 220 may be external (e.g., an electrical wall outlet) or internal (e.g., a battery). In an embodiment, where the body 202 is integral to a tool storage chest, substructure 208 may not exist or may be an integrated part of the tool storage chest.

Figure 3:
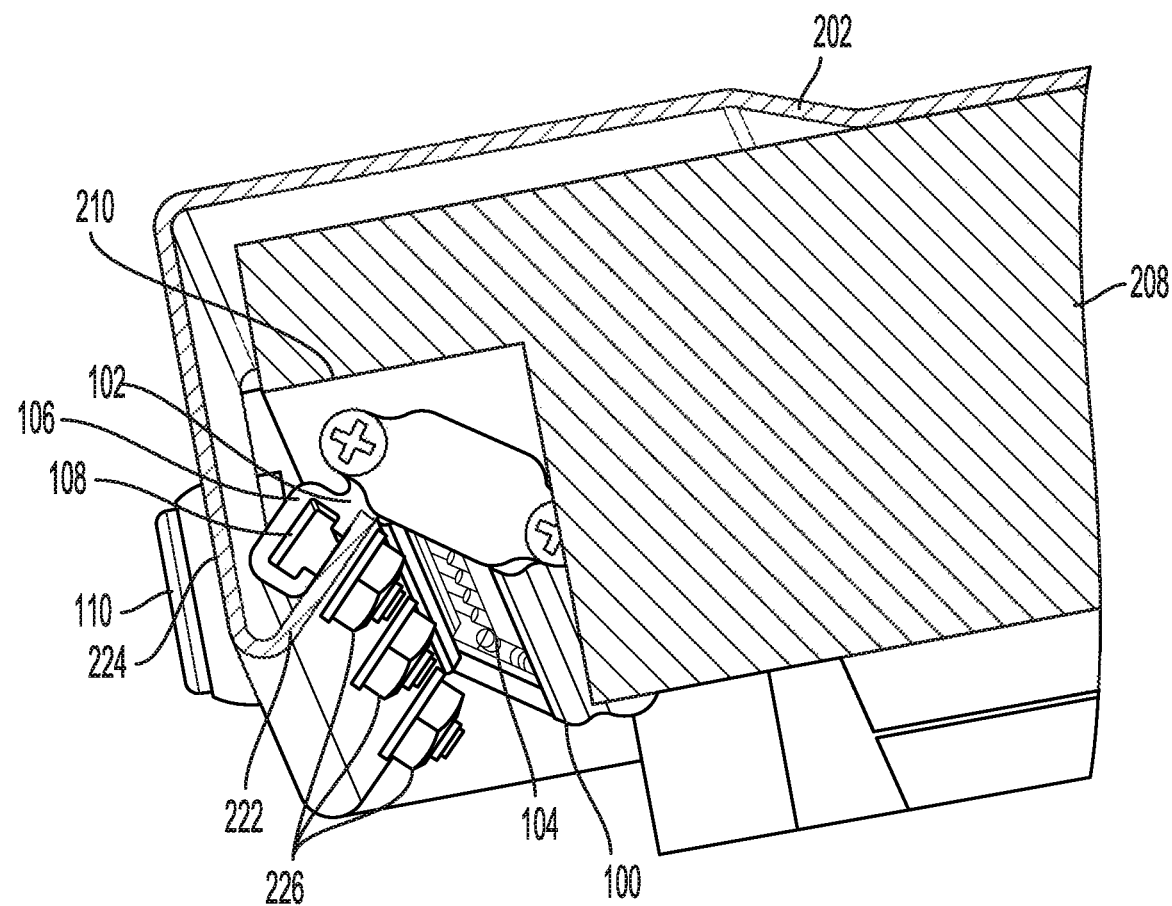
FIG. 3 is a section view of a portion of the top portion of the storage unit of FIG. 1 illustrating the illumination assembly.

Referring to FIGS. 3 and 4, the body 202 can include a first face 224 that extends in a downwardly direction from a second face 228 of the body 202, and substantially perpendicular or orthogonal to the second face 228. A first flange 222 also extends in an inwardly direction from the first face 224 towards the substructure 208. For example, as illustrated in FIG. 4, the first flange 222 and the first face 224 may be angled relative to each other by an angle α. The first flange 222 may also include apertures adapted to respectively receive fasteners 226 that couple the illumination assembly 100 to the first flange 222. For example, the attachment feature 108 may include a channel or groove that receives a head of a fastener, such as a bolt, and a shank of the fastener may extend through an aperture in the first flange 222. A nut and washer may then be disposed on the shank of the fastener, to couple the lighting assembly 100 to the top portion 200.

As described above, the angle of the housing 102 relative to the bracket 106 is illustrated as angle β. The angles α and β are selected such that a light emitted from the light source 104 is projected approximately along an illumination line 230 and outwardly at a light distribution angle γ. The illumination line 230 can be substantially perpendicular to the second face 228, and the light distribution angle γ may be about zero to about eighty degrees.

Figure 6:
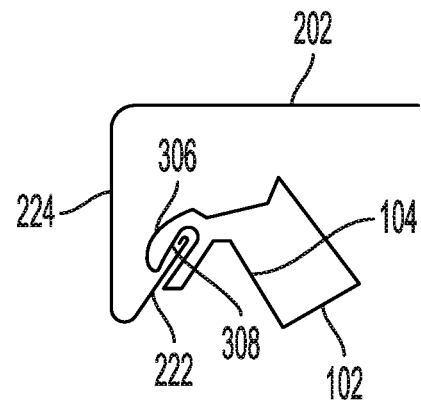
FIG. 6 is a section view illustrating an illumination assembly coupled to a top portion (such as a working surface area) of a storage unit according to another embodiment of the present invention.

Referring to FIG. 6, the angle α may be selected to cause the bracket 306 to couple to the first flange 222 without the fastener(s) 226. Additionally or alternately, the bracket 306 may have an elongated end 308 that extends down into the bent portion of the first flange 222 to allow the bracket 306 to couple to the first flange 222 without the need for the fastener assembly 226.

Figure 7:
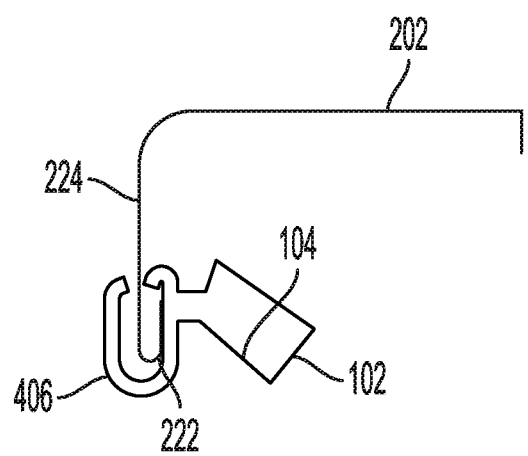
FIG. 7 is a section view illustrating an illumination assembly coupled to a top portion (such as a working surface area) of a storage unit according to another embodiment of the present invention.

Referring to FIG. 7, the bracket 406 may be visible from the first face 224 when coupled the first flange 222.

In an embodiment, the direction of angle α can be reversed from the orientation illustrated in FIGS. 3 and 4 such that the first flange 222 protrudes beyond the body 202. In this embodiment, the illumination assembly may protrude from and be visible from an exterior of the body 202.

Figure 8:
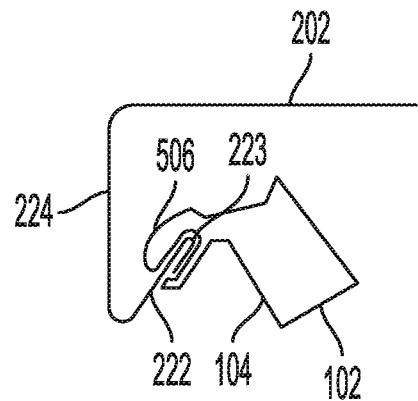
FIG. 8 is a section view illustrating an illumination assembly coupled to a top portion (such as a working surface area) of a storage unit according to another embodiment of the present invention.

In an embodiment, a second flange 223, as illustrated in FIG. 8, is formed at an end of the first flange 222 after the bend angle α. The second flange 223 may be formed in either a direction towards the first face 224 or away from the first face 224. The second flange can couple with the bracket 506 such that the illumination assembly 100 can be coupled to the body 202 without using the fastener assembly 226.

In an embodiment, the angle of the housing β can be changed by the bracket 106 and the housing 102 being two separate pieces that are rotatably or pivotably coupled to one another, such that they can be articulated or pivotable relative to each other, or, where the bracket 106 and the housing 102 are a single integrated component, the bracket 106 and the housing 102 are flexible relative to each other. The articulation or pivot relationship can be selected and locked in place to change the angle of the light distribution angle γ, such that the illumination line 230 is not substantially perpendicular to the second face 228.

Figure 9:
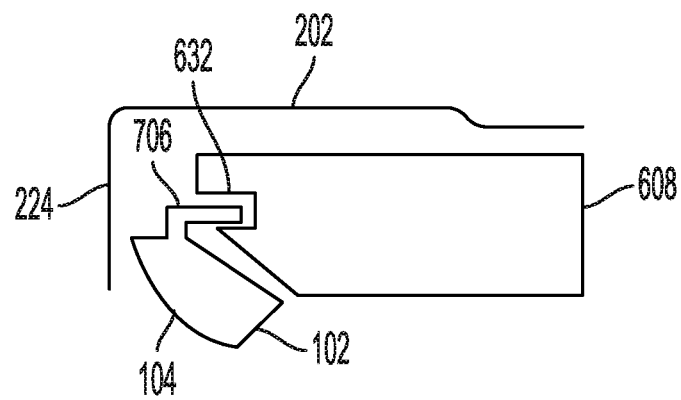
FIG. 9 is a section view illustrating an illumination assembly coupled to a substructure of a top portion (such as a working surface area) of a storage unit according to another embodiment of the present invention.

Referring to FIG. 9, the substructure 608 can have a mounting feature, such as a channel 632 that is cut and angled in such a way that the bracket 706 can be coupled to the substructure 608 without the first flange 222.

Referring to FIG. 5, a simplified block diagram of one example of the illumination assembly 100 and electronic components, such as the switch 110 and the power source 220, is illustrated. As shown in FIG. 5, the light source 104 may be electrically coupled to a power source 220 via the switch 110, or the light source may be electrically coupled to the power source 220 via the switch 110 and the electrical outlet 204. A circuit board (not shown) may also be included to which the various components are electrically coupled or attached. The switch 110, the power source 220, and the illumination source 104 can be coupled to the circuit board and thus to one another via the board, as is known in the art. The light source 104 may be disposed on the board. Wires may be used to connect the various components to the circuit board. Electrical contacts can be provided as well between the various components and the circuit board. The functional design of these components can vary considerably within the spirit and scope of the present invention.

As used herein, the term "coupled" and its functional equivalents are not intended to necessarily be limited to direct, mechanical coupling of two or more components. Instead, the term "coupled" and its functional equivalents are intended to mean any direct or indirect mechanical, electrical, or chemical connection between two or more objects, features, work pieces, and/or environmental matter. "Coupled" is also intended to mean, in some examples, one object being integral with another object.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of the inventors' contribution. The actual scope of the protection sought is intended to be defined in the following claims when viewed in their proper perspective based on the prior art.

What is claimed is:

1. An illumination assembly for a storage unit having a drawer with an interior and a body with a flange extending therefrom at a first angle, the illumination assembly comprising:
   a housing;
   an illumination source disposed in the housing and adapted to emit light; and
   a bracket coupled to the housing and extending at a second angle relative to the housing, wherein the bracket is adapted to couple to the flange and the bracket and the flange cooperatively direct light emitted from the illumination source towards the interior of the drawer.

2. The illumination assembly of claim 1, wherein the bracket and housing are pivotable relative to one another, and the second angle is based on a selected pivotal relationship between the bracket and the housing.

3. The illumination assembly of claim 1, wherein the bracket includes a groove adapted to receive a head of a fastener to couple the bracket to the flange.

4. The illumination assembly of claim 1, wherein the illumination source is a light emitting diode.

5. The illumination assembly of claim 1, wherein the bracket is adapted to receive a fastener to couple the bracket to the flange of the storage unit.

6. The illumination assembly of claim 1, further comprising a switch electrically coupled to the illumination source and actuatable to selectively cause the illumination source to be in the ON state or an OFF state.

7. The illumination assembly of claim 6, wherein the switch is a motion sensor adapted to cause the illumination source to be in the ON state when the drawer is opened.

8. The illumination assembly of claim 6, wherein the switch is adapted to cause the illumination source to change from the ON state to the OFF state when a predetermined amount of time is reached.

9. The illumination assembly of claim 1, wherein the bracket is integral to the housing.

10. A storage unit having a compartment with an interior, comprising:
    a top portion with a body and a flange that extends from the body at a first angle; and
    an illumination assembly including:
       a housing;
       an illumination source disposed in the housing; and
       a bracket coupled to the housing and extending at a second angle relative to the housing, wherein the bracket is coupled to the flange and the flange and the bracket cooperatively cause the illumination source to emit light towards the interior of the compartment when the illumination source is in an ON state.

11. The storage unit of claim 10, wherein the storage unit is a tool storage chest and the compartment is a drawer.

12. The storage unit of claim 10, wherein the body is a semi-enclosed case.

13. The storage unit of claim 10, wherein the flange extends at the first angle with respect to a first surface of the body.

14. The storage unit of claim 13, wherein the flange extends in a direction away from the body.

15. The storage unit of claim 13, wherein the flange extends in a direction towards an interior of the storage unit.

16. The storage unit of claim 10, wherein the bracket and housing are pivotable relative to one another, and the second angle is based on a selected pivotal relationship between the bracket and the housing.

17. The storage unit of claim 10, wherein the bracket includes a groove adapted to receive a head of a fastener to couple the bracket to the flange.

18. The storage unit of claim 10, further comprising a switch coupled to the top portion and electrically coupled to the illumination source, wherein the switch is actuatable to cause the illumination source to be in the ON state or an OFF state.

19. The storage unit of claim 18, wherein the switch is a motion sensor adapted to cause the illumination source to be in the ON state when the compartment is opened.

20. The storage unit of claim 18, wherein the switch is adapted to cause the illumination source to change from the ON state to the OFF state when a predetermined amount of time is reached.

21. An illumination assembly for a storage unit having a drawer with an interior, comprising:
   a housing;
   an illumination source disposed in the housing; and
   a bracket pivotably coupled to the housing and extending at an angle relative to the housing,
   wherein the angle is based on a selected pivotal relationship between the bracket and the housing, and
   wherein the bracket is adapted to couple to the storage unit and causes the illumination source to emit light towards the interior of the drawer when the illumination source is in an ON state.

22. The illumination assembly of claim 21, wherein the bracket is adapted to be coupled to a substructure of the storage unit.

\* \* \* \* \*